US008835011B2

(12) United States Patent
Gahagan et al.

(10) Patent No.: US 8,835,011 B2
(45) Date of Patent: Sep. 16, 2014

(54) COVER ASSEMBLY FOR ELECTRONIC DISPLAY DEVICES

(75) Inventors: Kevin Thomas Gahagan, Painted Post, NY (US); Raymond G Greene, Ithaca, NY (US); Katherine Rose Rossington, Corning, NY (US)

(73) Assignee: Corning Incorporated, Corning, NY (US)

( * ) Notice: Subject to any disclaimer, the term of this patent is extended or adjusted under 35 U.S.C. 154(b) by 835 days.

(21) Appl. No.: 12/974,052

(22) Filed: Dec. 21, 2010

(65) Prior Publication Data
US 2011/0165380 A1 Jul. 7, 2011

Related U.S. Application Data

(60) Provisional application No. 61/293,034, filed on Jan. 7, 2010.

(51) Int. Cl.
*B32B 17/06* (2006.01)
*C03C 21/00* (2006.01)
*C03C 3/091* (2006.01)
*C03C 3/085* (2006.01)

(52) U.S. Cl.
CPC .............. *C03C 21/002* (2013.01); *C03C 3/091* (2013.01); *C03C 3/085* (2013.01)
USPC ........... 428/426; 428/220; 428/410; 428/428; 428/432; 428/688; 428/689; 428/701; 428/702

(58) Field of Classification Search
USPC ......... 428/426, 432, 688, 689, 701, 702, 220, 428/410, 428
See application file for complete search history.

(56) References Cited

U.S. PATENT DOCUMENTS

| | | | | |
|---|---|---|---|---|
| 5,895,768 A * | 4/1999 | Speit | .......................... | 428/846.9 |
| 6,169,047 B1 * | 1/2001 | Nishizawa et al. | ............. | 501/66 |
| 6,303,528 B1 * | 10/2001 | Speit et al. | ....................... | 501/69 |
| 6,881,692 B2 * | 4/2005 | Murata et al. | ................... | 501/66 |
| 7,534,734 B2 * | 5/2009 | Ellison | ........................... | 501/66 |
| 7,666,511 B2 * | 2/2010 | Ellison et al. | ................ | 428/426 |
| 7,727,917 B2 * | 6/2010 | Shelestak et al. | .............. | 501/69 |
| 8,187,987 B2 * | 5/2012 | Amin et al. | ...................... | 501/69 |
| 8,232,218 B2 * | 7/2012 | Dejneka et al. | ................ | 501/68 |
| 8,415,013 B2 * | 4/2013 | Barefoot et al. | ............. | 428/410 |
| 2002/0151426 A1 * | 10/2002 | Murata et al. | ................... | 501/66 |
| 2004/0071960 A1 * | 4/2004 | Weber et al. | .................. | 428/336 |
| 2005/0090377 A1 * | 4/2005 | Shelestak et al. | ............. | 501/69 |
| 2006/0003884 A1 * | 1/2006 | Nishizawa et al. | ............. | 501/72 |
| 2006/0293162 A1 * | 12/2006 | Ellison | ........................... | 501/66 |
| 2008/0020919 A1 * | 1/2008 | Murata | .......................... | 501/66 |
| 2008/0286548 A1 * | 11/2008 | Ellison et al. | ................ | 428/220 |
| 2009/0142568 A1 * | 6/2009 | Dejneka et al. | .............. | 428/220 |
| 2009/0197048 A1 * | 8/2009 | Amin et al. | ................... | 428/142 |
| 2009/0197088 A1 * | 8/2009 | Murata | ........................ | 428/410 |
| 2009/0220761 A1 * | 9/2009 | Dejneka et al. | .............. | 428/220 |
| 2009/0286091 A1 * | 11/2009 | Danielson et al. | ............ | 428/426 |
| 2010/0035745 A1 * | 2/2010 | Murata | ........................... | 501/66 |
| 2010/0047521 A1 * | 2/2010 | Amin et al. | .................... | 428/141 |
| 2010/0087307 A1 * | 4/2010 | Murata et al. | ................... | 501/67 |
| 2010/0119846 A1 * | 5/2010 | Sawada | ......................... | 428/426 |
| 2011/0014475 A1 * | 1/2011 | Murata | ......................... | 428/410 |
| 2011/0165380 A1 * | 7/2011 | Gahagan et al. | ............. | 428/156 |
| 2011/0165393 A1 * | 7/2011 | Bayne et al. | ................... | 428/215 |
| 2011/0200804 A1 * | 8/2011 | Tomamoto et al. | ........... | 428/213 |
| 2011/0274916 A1 * | 11/2011 | Murata | ......................... | 428/332 |
| 2012/0196110 A1 * | 8/2012 | Murata et al. | ................. | 428/220 |
| 2012/0251743 A1 * | 10/2012 | Amin et al. | .................. | 428/34.4 |

FOREIGN PATENT DOCUMENTS

| | | |
|---|---|---|
| CN | 101092280 A | 12/2007 |
| JP | 2006347795 A | 12/2006 |
| WO | 2009081740 A1 | 7/2009 |

OTHER PUBLICATIONS

Jiang, Shengming, "A CAC Considering Both Intracell and Intercell Handoffs for Measurement-based DCA," IEEE Transactions on Vehicular Technology, vol. 56, No. 2, Mar. 2007.
Tsagkaris, Kostas, "A Handover Scheme Based on Moving Extended Cells for 60 GHz Radio-over-Fiber Networks," IEEE Communications Society, 2009 Proceedings.
Cho, Ho-Shin, "A Movable Safety Zone Scheme in Urban Fiber-Optic Microcellular Systems," IEEE Transactions on Vehicular Technology, vol. 48, No. 4, Jul. 1999.
Kim, Hong Bong, "A Radio Over Fiber Network Architecture for Road Vehicle Communication Systems," IEEE 2005.
Wille, V., "Capacity Increase in Cellular Radio Networks Using Existing Base Station Sites," The Institution of Electrical Engineers, 1996.
Yee, Ming-Li, "Performance Analysis of IEEE 802.16e WiMAX Radio-over-fiber Distributed Antenna System," IEEE.
Chow, Bruce, "Radio-over-Fiber Distributed Antenna System for WiMAX Bullet Train Field Trial," 2009 IEEE Mobile WiMAX Symposium.
Chowdhury, Arshad, "Multi-band Transport Technologies for In-building Host-Neutral Wireless over Fiber Access Systems," IEEE 2009.
Posti, Harri, "Receiver Dimensioning in a Hybrid Multicarrier GSM Base Station," IEEE Personal Communications, Aug. 1999.
Beck, Reiner, "Strategies for Handover and Dynamic Channel Allocation in Micro-Cellular Mobile Radio Systems," IEEE 1989.

\* cited by examiner

Primary Examiner — David Sample
Assistant Examiner — Lauren Colgan
(74) Attorney, Agent, or Firm — Robert Santandrea

(57) ABSTRACT

A cover assembly for a display device, such as a three-dimensional liquid crystal (3-D LCD) display. The cover assembly includes an aluminosilicate glass substrate that is substantially free of retardance-induced visual defects and has a thickness of less than 2 mm, a retardance of less than or equal to 5 nm over an area of at least 170 in$^2$ (20 in diagonal), a 4-point bend strength of greater than 150 MPa.

20 Claims, No Drawings

COVER ASSEMBLY FOR ELECTRONIC DISPLAY DEVICES

CROSS REFERENCE TO RELATED APPLICATIONS

This application claims the benefit of U.S. Provisional Application No. 61/293,034, filed Jan. 7, 2010.

TECHNICAL FIELD

The present disclosure relates to glass materials that can be used as in a cover assembly for electronic display devices such as, for example, three-dimensional liquid crystal (3-D LCD) displays. In particular, the disclosure is directed to an ion-exchanged glass article having high strength and low retardance and which is suitable for use in such cover assemblies.

BACKGROUND

Electronic display devices such as 3-D LCD displays have become larger. The trend towards display devices having larger surface area presents a continuing challenge regarding design of some components of such devices.

One particular challenge is associated with the design of the cover assembly that is used to shield the outer surface of the display. This design challenge generally arises from conflicting design goals—the desirability of making the assembly lighter and thinner, and the desirability of making the enclosure stronger and more rigid, while maintaining the quality of the displayed image. Lighter cover assemblies, which typically use thin plastic structures and few fasteners, tend to be more flexible, are prone to scratching, and have a greater tendency to buckle and bow, whereas stronger and more rigid enclosures typically use thicker plastic structures and more fasteners which are thicker and heavier and tend to degrade the quality, measured in terms of retardance, of the displayed image. The increased weight of the stronger, more rigid assembly may lead to user dissatisfaction, and bowing/buckling of the lighter structures that may damage the internal parts of the display device.

SUMMARY

A cover assembly for an electronic display device such as, for example, a 3-D LCD display, is provided. The cover assembly comprises an aluminosilicate glass substrate having a thickness of less than 2 mm. the glass substrate has a retardance of less than or equal to 5 nm over an area of at least 170 in$^2$, and a 4-point bend strength of greater than 150 MPa, wherein the substrate is substantially free of retardance-induced visual defects.

DETAILED DESCRIPTION

As is described herein below, the needs of the industry for more cost effective, larger, stronger and aesthetically more pleasing electronic display devices are met through the use of high strength, low retardance glass substrates as the cover assembly in such devices devices. These glass materials possess certain advantages such as weight and/or resistance to impact damage (e.g., denting) and scratching over the present materials such as plastic.

The vast majority of flat panel display technologies form an image by emitting or reflecting light that is substantially polarized. Examples include, but are not limited to, liquid crystal displays employing an output polarizer for generating an image and organic light emitting diode displays employing circular polarizers for enhancement of contrast ratio in sunlight.

Accordingly, a cover assembly for a display is provided. Such displays include, but are not limited to, electronic displays such as three-dimensional liquid crystal (also referred to herein as "3-D LCD") displays, mobile or outdoor displays, public information displays, and displays that are viewable using polarized lenses. The cover assembly serves to protect an external surface of the display from damage, such as point impacts, scratches, and the like.

Regardless of the type of display, if a cover assembly is placed over the display, optical retardance in the cover assembly will modulate the direction of polarization of light emanating from the display. If the display is then viewed through a polarizing optical element, spatial variations in the retardance may be visible as a non-uniform degraded image, a defect commonly referred to as retardance mura (also referred to herein as "retardance"). This arrangement is likely to be encountered in display applications such as outdoor public information displays, where viewers often wear polarized sunglasses, and 3-D display applications where polarizing elements are used to control separate images viewed by the left and right eye, respectively. In the case of 3-D displays, retardance mura can also generate crosstalk where the image intended for one eye is visible to the other eye, resulting in a blurred image and loss of the intended 3-D stereo effect.

In specific embodiments comprising a 3-D display, the cover assembly can be incorporated as part of a liquid crystal optical modulating cell that is placed between the display and the viewer. This type of display further requires the cover assembly to be substantially free of cord, streak, or other surface defects that cause cell gap variation in liquid crystal cell assemblies. Such variations, if present, generate retardance mura.

The cover assembly comprises an aluminosilicate glass substrate having a thickness of up to about 2 mm and a four-point bend strength of greater than 150 MPa and, in some embodiments, greater than 350 MPa. The cover assembly also has a retardance of less than or equal to 5 nm over an area of at least 170 in$^2$ (about 1100 cm$^2$, or equivalent to a display having a 20 in (about 50 cm) diagonal) and is substantially free of retardance-induced visual defects.

In some embodiments, the inherent retardance of the glass substrate is minimized by controlling the size and periodicity of features that are inherent in the glass, such as cords. Accordingly, the glass substrate, in some embodiments, comprises a cord (or cords) having an average cord height of less than 20 nm over a period ranging from 2 mm up to 10 mm. In addition to inherent retardance caused by the presence of cords, streaks or other surface defects the retardance, in some embodiments, includes a thermally-induced component (thermally-induced retardance) as well. To further minimize retardance, the variation of the thickness of the aluminosilicate glass substrate can be controlled. In some embodiments, the thickness of the glass substrate varies by less than 1 µm/cm.

In some embodiments the cover assembly can further include at least one of an anti-glare and an anti-reflective surface. Such surfaces may be formed directly on at least one surface of the glass substrate by means known in the art such as, but not limited to, etching, embossing, grinding, polishing, and the like. Alternatively, anti-glare and/or an anti-reflective surfaces can be provided as coatings applied to at least one surface of the glass substrate, wherein such coatings comprise anti-glare and/or anti-reflective materials that are known in the art.

The cover assembly is, in some embodiments, resistant to scratching. In those instances, for example, where the glass substrate is an ion-exchanged alkali aluminosilicate glass, the glass substrate, when scratched with a Knoop diamond at a load of at least 5 N, is free of damage due to chipping greater than three times the width w of the formed scratch.

The aluminosilicate glass material that is suitable for use as a substrate in the cover assembly described herein is, in one embodiment, an alkali aluminosilicate glass. In another embodiment, the aluminosilicate glass is an alkali-free aluminosilicate glass. Such glasses generally possess sufficient chemical and mechanical durability, for this application, particularly when compared to plastic and other non-alkali glass based substrates.

The material selected generally depends on many factors including, but not limited to, surface compressive stress and retardance. Formability, finishing, design flexibility, and manufacturing costs associated with this glass material also factor into whether the particular glass material is suitable for use as the cover assembly. Furthermore, the material selected may also depend on aesthetics including color, surface finish, weight, retardance, and the like.

In one embodiment, the cover glass assembly comprises a glass substrate that is ion-exchanged; i.e., the glass substrate has at least one ion-exchanged surface. The glass is chemically strengthened by ion exchange in which smaller metal ions in the glass are replaced or "exchanged" by larger metal ions of the same valence within a layer that is close to the outer surface of the glass. The replacement of smaller ions with larger ions creates a compressive stress within the layer. In one embodiment, the metal ions are monovalent alkali metal ions (e.g., $Na^+$, $K^+$, $R^+$, and the like), and ion exchange is accomplished by immersing the glass in a bath comprising at least one molten salt (e.g., $KNO_3$, $K_2SO_4$, KCl, or the like) of the larger metal ion that is to replace the smaller metal ion in the glass. Alternatively, other monovalent cations such as $Ag^+$, $Tl^+$, $Cu^+$, and the like can be exchanged for the alkali metal cations in the glass. Ion exchange process or processes that are used to strengthen the glass are know in the art and include, but are not limited to, immersion in a single bath or multiple baths of like or different compositions with washing and/or annealing steps between immersions.

The ion-exchanged surface has a compressive layer having a depth of layer (DOL) greater than or equal to 2% of the overall article thickness. In one embodiment, the glass substrate has at least one ion-exchanged ("IX") surface having a compressive stress of at least 500 MPa. Any ion exchange process known to those in the art is suitable as long as the above DOL and compressive stress are achieved.

In one non-limiting example, the glass substrate of the cover glass assembly has an overall thickness of 2 mm and compressive layer or DOL of 40 μm, wherein the compressive layer has a compressive stress of at least 525 MPa. Again, any ion exchange process which achieves these features is suitable.

It should be noted that in addition to single step ion-exchange processes, multiple ion exchange procedures can be utilized to create a designed IX profile for enhanced performance. That is, a stress profile created to a selected depth by using ion-exchange baths of differing concentration of ions, or by using multiple baths using different ion species having different ionic radii. Additionally, one or more heat treatments can be utilized before or after ion exchange to tailor the stress profile by either further diffusing the ions or by relaxing areas of high stress.

In one particular embodiment, the cover assembly comprises an ion-exchanged glass substrate having a fracture toughness of greater than 0.7 $MPa \cdot m^{1/2}$, an MOR of greater than 350 MPa, a Vickers hardness of at least 600 $kgf/mm^2$, a Young's Modulus of greater than 70 GPa, a thermal conductivity of less than 2.0 W/m° C., a refractive index of greater than 1.5031 @633 nm, and a surface compressive stress of greater than 500 MPa.

This requisite fracture toughness in excess of 0.7 $MPa \cdot m^{1/2}$, in combination with the surface compressive stress exceeding 500 MPa and the MOR of greater than 350 MPa, all function to result in a cover assembly that is sufficiently strong and durable so as to withstand typical consumer use/applications. One measure of this durability feature which the aforementioned ion-exchanged glass article is capable of meeting is the ability of the ion-exchanged glass article to withstand a standard drop testing requirement involving 5 impacts/drops from a height of one meter onto a hard surface such as concrete or granite.

In a still further embodiment, the cover assembly comprises a glass substrate that exhibits a fracture toughness of greater than 0.7 MPa·m1/2, and an MOR of greater than 475 MPa, preferably greater than 525 MPa.

Thermal conductivities at the aforementioned levels, particularly conductivities that are less than 2 W/m° C., are likely to result in a cover assembly that remains cool to the touch even in high temperatures approaching as high as 100° C. In one embodiment, the glass substrate exhibits a thermal conductivity of less than 1.5 W/m° C. For comparison, it should be noted that a ceramic such as alumina may exhibit thermal conductivities as high as 29.

In certain embodiments the glass substrate has a transparent surface. The transparent surface of the glass substrate has a Ra roughness of less than 50 nm, and, in one embodiment, less than 15 nm. In order to achieve this level of surface roughness, the surface of the glass substrate can be optionally polished using standard polishing techniques so as to achieve the requisite surface roughness. Alternatively, the glass substrate can formed using a mold having a polished or non-textured surface so as to achieve the requisite surface roughness.

A representative alkali aluminosilicate glass compositional family, suitable for use in the cover assembly, comprises, in it's broadest embodiment, in mole percent as oxides on a batched basis, 40-80% $SiO_2$, 0-28% $Al_2O_3$, 0-8% $B_2O_3$, 0-18% $Li_2O$, 0-10% $Na_2O$, 0-11% $K_2O$, 0-16% MgO, 0-10% $MgF_2$, 0-8% CaO, 0-15% $CaF_2$, 0-20% SrO, 0-12% BaO, 0-8% ZnO, 0-4% $P_2O_5$, 0-8% $TiO_2$, 0-5% $ZrO_2$, 0-1% $SnO_2$, 0-1 $Sb_2O_3$, 0-1% $As_2O_3$. As used herein, the phrase "mole percent as oxides on a batched basis" means that impurities such as iron, nickel, cobalt, and other elements can be present in the materials used to prepare the glass and are not to be included or understood as being deliberately added to form the glass composition unless desired for color.

In some embodiments, the suitable glass substrate of the cover assembly is an alkali aluminosilicate that is capable of being down-drawn (e.g., slot-drawn or fusion-drawn) into thin glass articles which can be subsequently formed into the cover assembly. The glass has a liquidus viscosity of at least 130 kpoise which enables the glass to be down-drawn. As used herein, "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature.

In a second embodiment, the alkali aluminosilicate glass comprises, consists essentially of, or consists of the following oxides, the concentrations of which are expressed in mole percent (mol %): 64≤$SiO_2$≤68; 12≤$Na_2O$≤16; 8≤$Al_2O_3$≤12; 0≤$B_2O_3$≤3; 2≤$K_2O$≤5; 4≤MgO≤6; and 0≤CaO≤5. In addition, 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≤2 mol %; 2 mol %≤$Na_2O$–$Al_2O_3$≤6 mol %; and 4 mol %≤($Na_2O$+$K_2O$)–$Al_2O_3$≤10 mol %.

In a third embodiment, the alkali aluminosilicate glass comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O$+$Na_2O$+$K_2O$≤20 mol % and 0 mol %≤MgO+CaO≤10 mol %. In a fourth embodiment, the alkali aluminosilicate glass comprises, consists essentially of, or consists of: 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; and 0 mol %≤CaO≤3 mol %. In a fifth embodiment, alkali aluminosilicate glass comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$, and wherein the $$\text{ratio } \frac{Al_2O_3(\text{mol \%}) + B_2O_3(\text{mol \%})}{\Sigma \text{ modifiers(mol \%)}} > 1,$$

where $Na_2O$ and $K_2O$ are modifiers.

Representative examples from each of the first, second, and third aforementioned alkali aluminosilicate glass compositional ranges are provided in Table 1, with Example 1 being representative of the first and broadest compositional family and Examples 2 and 3 being representative of the second and third down-drawable compositions, respectively. Additionally, disclosed in Table 1 are the following properties of each of the representative compositions; Strain Point (Strain), Annealing Point (Anneal), Softening Point (Softening), Density (Density) and Coefficient of Thermal Expansion (CTE).

TABLE 1

| | Composition Wt % | | |
|---|---|---|---|
| | Ex.1 | Ex. 2 | Ex. 3 |
| $SiO_2$ | 60.5 | 61.45 | 61.54 |
| $Al_2O_3$ | 17.0 | 16.4 | 16.24 |
| $Na_2O$ | 12.5 | 13 | 13.43 |
| $K_2O$ | 3.35 | 3.45 | 3.57 |
| MgO | 3.6 | 3.53 | 3.56 |
| CaO | 0.5 | 0.39 | 0.5 |
| $B_2O_3$ | | 0.68 | 0.65 |
| $SnO_2$ | 0.023 | 0.014 | 0.48 |
| $ZrO_2$ | | 0.04 | 0.02 |
| $Fe_2O_3$ | 0.025 | 0.02 | 0.02 |
| $TiO_2$ | 0.8 | | |
| $As_2O_3$ | 1.05 | 1.01 | |
| $Sb_2O_3$ | 0.15 | | |
| Property | | | |
| Strain (° C.) | 574 | 546 | 553 |
| Anneal (° C.) | 624 | 598 | 602 |

TABLE 1-continued

| | Composition Wt % | | |
|---|---|---|---|
| | Ex.1 | Ex. 2 | Ex. 3 |
| Softening (° C.) | 875 | 833 | 837 |
| Density (g/cm³) | 2.45 | 2.45 | 2.452 |
| CTE (×$10^{-7}$/° C., 0-300° C.) | 88 | 90 | 91.4 |

In another embodiment, the glass substrate is an alkali-free aluminosilicate glass. in particular embodiments, the alkali-free aluminosilicate glass comprises, consists essentially of, or consists of: 64.0-71.0 mol % $SiO_2$; 9.0-12.0 $Al_2O_3$; 7.0-12.0 mol % $B_2O_3$; 1.0-3.0 mol % MgO; 6.0-11.5 mol % CaO; 0-1.0 mol % SrO; and 0-0.1 mol % BaO, wherein Σ[RO]/[$Al_2O_3$]≥1.00.

In one embodiment, Σ[RO]/[$Al_2O_3$]≤1.03), whereas in other embodiments, the Σ[RO]/[$Al_2O_3$] ratio is less than or equal to 1.25 and, preferably, less than or equal to 1.12. Also, the alkali-free aluminosilicate glass preferably has at least one (more preferably, all) of the following compositional characteristics: (a) on an oxide basis, the alkali-free aluminosilicate glass comprises at most 0.05 mole percent $As_2O_3$; (b) on an oxide basis, the alkali-free aluminosilicate glass comprises at most 0.05 mole percent $Sb_2O_3$; (c) on an oxide basis, the glass comprises at least 0.01 mole percent $SnO_2$.

In one embodiment, alkali-free aluminosilicate glass sheets (which can be subsequently cut to form the glass substrate) are formed by a down-draw process (e.g., a fusion draw process). In this process, batch materials are selected, melted, and fined so that the glass making up the sheets comprises $SiO_2$, $Al_2O_3$, $B_2O_3$, MgO, and CaO, and, on an oxide basis, has a Σ[RO]/[$Al_2O_3$] ratio greater than or equal to 1.0; and a MgO content greater than or equal to 1.0 mole percent (and preferably less than or equal to 3.0 mole percent). The fining is performed without the use of substantial amounts of either arsenic or antimony (i.e., the concentrations of $As_2O_3$ and $Sb_2O_3$ are each less than or equal to 0.05 mole percent). A population of 50 sequential glass sheets produced by the down-draw process from the melted and fined batch materials has an average gaseous inclusion level of less than 0.05 gaseous inclusions/cubic centimeter, where each sheet in the population has a volume of at least 500 cubic centimeters.

Preferably, the glass making up the alkali-free aluminosilicate glass sheet is also substantially free of BaO (i.e., the concentration of BaO is less than or equal to 0.05 mole percent). Also, $SnO_2$ is preferably used in the fining.

In accordance with each of the foregoing aspects described herein, the alkali-free aluminosilicate glass has some and, in some embodiments, all of the following properties:

(a) a density that is less than or equal to 2.41 grams/cm³;
(b) a liquidus viscosity that is greater than or equal to 100,000 poise;
(c) a strain point that is greater than or equal to 650° C.;
(d) a linear coefficient of thermal expansion (CTE) over the temperature range 0-300° C. which satisfies the relationship:

$$28 \times 10^{-7}/° C. \leq CTE \leq 34 \times 10^{-7}/° C.$$

Specific representative examples of alkali-free aluminosilicate glass substrates from each of these two aforementioned alkali-free aluminosilicate glass compositional ranges that are incorporated into the cover assembly are listed in Table 2. Table 2 includes examples of the alkali-free aluminosilicate glasses described herein and comparative glasses in terms of mole percents, which are either calculated on an oxide basis from the glass batches (in the case of the crucible melts) or, for compositions prepared using a continuous melter, determined from measurements on the finished glass. Table I also lists various physical properties for these glasses, Units for the properties listed in Table 2 are as follows:

| | |
|---|---|
| Density | grams/centimeter$^3$ |
| CTE | $\times 10^{-7}/°$ C. (0-300° C.) |
| Strain Point | ° C. |
| Young's Modulus | $\times 10^{+6}$ psi |
| Melting Temp. | ° C. |
| Liquidus Temp. | ° C. |
| Liquidus Viscosity | poises |

Inasmuch as the sum of the individual constituents totals or very closely approximates 100, for all practical purposes the reported values may be deemed to represent mole percent. The actual batch ingredients may comprise any materials, either oxides, or other compounds, which, when melted together with the other batch components, will be converted into the desired oxide in the proper proportions. For example, $SrCO_3$ and $CaCO_3$ can provide the source of SrO and CaO, respectively.

The specific batch ingredients used to prepare the glasses of Table 2 were fine sand, alumina, boric acid, magnesium oxide, limestone, strontium carbonate or strontium nitrate, and tin oxide For examples 1-10 listed in Table 2, the melting was done in a laboratory scale, continuous, Joule-heated melter. Batches of the raw materials massing 45.4 kg were weighed into a mechanical mixer and combined together for five minutes. An amount of water corresponding to about 0.25 kg was added to the mixture during the last 60 seconds of mixing to reduce dust generation. The mixture was loaded using a screw feeder into a ceramic-lined furnace with tin oxide electrodes and opposing burners firing over the melt surface. The power supplied by the electrodes was controlled by keeping the glass at a near-constant resistivity, corresponding to temperatures between 1590° C. and 1610° C. The glass moved from the melter into a platinum-based conditioning system consisting of a high-temperature finer followed by a stir chamber. The finer and stir chamber temperatures were kept constant throughout the experiment, whereas the melt temperature of the ceramic-lined melter was allowed to vary with composition. The glass drained out of the stir chamber through a heated orifice and was rolled into a ribbon approximately 5 mm thick and 30 mm wide. The glass from the ribbon was analyzed periodically for defects, which were identified, counted, and converted to defects per pound. Compositions were obtained from the ribbon via standard chemical methods, and physical properties were obtained as described below.

The glass properties set forth in Table 2 were determined in accordance with techniques conventional in the glass art. Thus, the linear coefficient of thermal expansion (CTE) over the temperature range 0-300° C. is expressed in terms of $\times 10^{-7}/°$ C. and the strain point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81). The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. The liquidus viscosity in poises was determined from the liquidus temperature and the coefficients of the Fulcher equation. Young's modulus values in terms of Mpsi were determined using a resonant ultrasonic spectroscopy technique of the general type set forth in ASTM E1875-00e1.

TABLE I

| | 1 | 2 | 3 | 4 | 5 |
|---|---|---|---|---|---|
| Composition (mol %) | | | | | |
| $SiO_2$ | 69.06 | 68.64 | 68.01 | 68.46 | 69.28 |
| $Al_2O_3$ | 10.23 | 10.46 | 10.66 | 10.49 | 10.18 |
| $B_2O_3$ | 9.97 | 9.90 | 10.11 | 9.99 | 9.79 |
| MgO | 1.87 | 1.82 | 1.84 | 1.84 | 1.85 |
| CaO | 8.31 | 8.62 | 8.71 | 8.66 | 8.34 |
| SrO | 0.49 | 0.49 | 0.60 | 0.49 | 0.49 |
| $SnO_2$ | 0.07 | 0.07 | 0.07 | 0.07 | 0.07 |
| $\Sigma[RO]/[Al_2O_3]$ | 1.04 | 1.04 | 1.05 | 1.05 | 1.05 |
| Properties | | | | | |
| Density | 2.369 | 2.374 | 2.378 | 2.375 | 2.369 |
| CTE | 31.2 | 31.5 | 32.3 | 31.5 | 31.1 |
| Strain Point | 665 | 664 | 667 | 666 | 666 |
| Young's Modulus | — | — | — | — | — |
| Melting Temp. | 1637 | 1624 | 1616 | 1619 | 1644 |
| Liquidus Temp. | 1130 | 1115 | 1130 | 1120 | 1145 |
| Liquidus Viscosity | 360000 | 408000 | 275000 | 363000 | 233000 |

TABLE I-continued

|  | 6 | 7 | 8 | 9 | 10 |
|---|---|---|---|---|---|
| Composition (mol %) | | | | | |
| $SiO_2$ | 69.08 | 68.88 | 69.11 | 68.52 | 67.80 |
| $Al_2O_3$ | 10.23 | 10.37 | 10.17 | 10.43 | 10.83 |
| $B_2O_3$ | 9.88 | 9.79 | 9.96 | 10.01 | 9.90 |
| MgO | 1.88 | 1.96 | 2.22 | 1.21 | 2.18 |
| CaO | 8.37 | 8.45 | 7.96 | 9.25 | 8.74 |
| SrO | 0.49 | 0.48 | 0.51 | 0.51 | 0.48 |
| $SnO_2$ | 0.07 | 0.07 | 0.07 | 0.07 | 0.07 |
| $\Sigma[RO]/[Al_2O_3]$ | 1.05 | 1.05 | 1.05 | 1.05 | 1.05 |
| Properties | | | | | |
| Density | 2.371 | 2.375 | 2.367 | 2.371 | 2.384 |
| CTE | 31.2 | 31.8 | 31.1 | 32.2 | 32.1 |
| Strain Point | 665 | 668 | 664 | 665 | 667 |
| Young's Modulus | — | — | — | — | — |
| Melting Temp. | 1621 | 1630 | 1634 | 1627 | 1612 |
| Liquidus Temp. | 1135 | 1120 | 1115 | 1115 | 1120 |
| Liquidus Viscosity | 243000 | 408000 | 481000 | 448000 | 330000 |

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:

1. A cover assembly for a display device, the cover assembly comprising an aluminosilicate glass substrate having a thickness of less than 2 mm, an area of at least 170 in$^2$ (20 in diagonal), a retardance of less than or equal to 5 nm over the area of at least 170 in$^2$ (20 in diagonal), a 4-point bend strength of greater than 150 MPa, and at least one of an antiglare surface and an anti-reflectance surface, and wherein the aluminosilicate glass substrate is substantially free of retardance induced visual defects.

2. The cover assembly of claim 1, wherein the retardance, when present in the cover glass assembly, comprises a thermally induced retardance component.

3. The cover assembly of claim 1, wherein at least one of the antiglare surface and the anti-reflectance surface is a coating disposed over a surface of the aluminosilicate glass substrate.

4. The cover assembly of claim 1, wherein the thickness of the aluminosilicate glass substrate varies by less than 1 μm/cm.

5. The cover assembly of claim 1, wherein the aluminosilicate glass substrate comprises a cord having an average cord height of less than 20 nm over a period ranging from 2 mm to 10 mm.

6. The cover assembly of claim 1, wherein the aluminosilicate glass substrate has a liquidus viscosity of greater than 130,000 poise at temperatures below 1275° C.

7. The cover assembly of claim 1, wherein the display device is a 3-D LCD device.

8. The cover assembly of claim 1, wherein the aluminosilicate glass is down-drawn.

9. The cover assembly of claim 1, wherein the aluminosilicate glass substrate is an alkali-free aluminosilicate glass.

10. The cover assembly of claim 9, wherein the alkali-free aluminosilicate glass comprises: 64.0-71.0 mol % $SiO_2$; 9.0-12.0 $Al_2O_3$; 7.0-12.0 mol % $B_2O_3$: 1.0-3.0 mol % MgO; 6.0-11.5 mol % CaO; 0-1.0 mol % SrO; and 0-0.1 mol % BaO, wherein $\Sigma[RO]/[Al_2O_3] \geq 1.00$.

11. The cover assembly of claim 1, wherein the aluminosilicate glass substrate is an alkali aluminosilicate glass.

12. The cover assembly of claim 11, wherein the alkali aluminosilicate glass comprises, in mole percent as oxides on a batched basis, of 40-80% $SiO_2$, 0-28% $Al_2O_3$, 0-8% $B_2O_3$, 0-18% $Li_2O$, 0-10% $Na_2O$, 0-11% $K_2O$, 0-16% MgO, 0-18% CaO, 0-15% $CaF_2$, 0-20% SrO, 0-12% BaO, 0-8% ZnO, 0-4% $P_2O_5$, 0-8% $TiO_2$, 0-5% $ZrO_2$, 0-1% $SnO_2$ and 0-1$Sb_2O_3$, 0-1% $As_2O_3$.

13. The cover assembly of claim 11, wherein the alkali aluminosilicate glass comprises: 64 mol % $\leq SiO_2 \leq 68$ mol %; 12 mol % $\leq Na_2O \leq 16$ mol %; 8 mol % $\leq Al_2O_3 \leq 12$ mol %; 0 mol % $\leq B_2O_3 \leq 3$ mol %; 2 mol % $\leq K_2O \leq 5$ mol %; 4 mol % $\leq MgO \leq 6$ mol %; and 0 mol % $\leq CaO \leq 5$ mol %, wherein: 66 mol % $\leq SiO_2+B_2O_3+CaO \leq 69$ mol %; $Na_2O+K_2O+B_2O_3+MgO+CaO+SrO > 10$ mol %; 5 mol % $\leq MgO+CaO+SrO \leq 8$ mol %; $(Na_2O+B_2O_3)-Al_2O_3 \leq 2$ mol %; 2 mol % $\leq Na_2O-Al_2O_3 \leq 6$ mol %; and 4 mol % $\leq (Na_2O+K_2O)-Al_2O_3 \leq 10$ mol %.

14. The cover assembly of claim 11, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq MgO+CaO \leq 10$ mol %.

15. The cover assembly of claim 11, wherein the alkali aluminosilicate glass comprises: 61 mol % $\leq SiO_2 \leq 75$ mol %; 7 mol % $\leq Al_2O_3 \leq 15$ mol %; 0 mol % $\leq B_2O_3 \leq 12$ mol %; 9 mol % $\leq Na_2O \leq 21$ mol %; 0 mol % $\leq K_2O \leq 4$ mol %; 0 mol % $\leq MgO \leq 7$ mol %; and 0 mol % $\leq CaO \leq 3$ mol %.

16. The cover assembly of claim 11, wherein the alkali aluminosilicate silicate glass comprises: 60-72 mol % $SiO_2$; 9-16 mol % $Al_2O_3$; 5-12 mol % $B_2O_3$; 8-16 mol % $Na_2O$; and 0-4 mol % $K_2O$, and wherein the ratio $$\frac{Al_2O_3(\text{mol \%}) + B_2O_3(\text{mol \%})}{\Sigma\,\text{modifiers(mol \%)}} > 1,$$

where $Na_2O$ and $K_2O$ are modifiers.

17. The cover assembly of claim 11, wherein the alkali aluminosilicate glass is ion-exchanged.

18. The cover assembly of claim 17, wherein the ion-exchanged alkali aluminosilicate glass has a compressive surface layer having a depth of layer greater than or equal to 2% of the thickness of the aluminosilicate glass substrate.

19. The cover assembly of claim 17, wherein the ion-exchanged alkali aluminosilicate glass is free of damage from chipping, the damage having a size greater than three times a width w of a scratch formed by a Knoop diamond at a load of at least 5 N.

20. The cover assembly of claim 17, wherein the alkali aluminosilicate glass exhibits a 4-point bend strength of greater than 350 MPa.

* * * * *